United States Patent
Irwan et al.

(10) Patent No.: US 10,404,696 B2
(45) Date of Patent: *Sep. 3, 2019

(54) ENABLING MULTITENANT DATA ACCESS ON A SINGLE INDUSTRIAL NETWORK

(71) Applicant: Xage Security, Inc., Palo Alto, CA (US)

(72) Inventors: Susanto Junaidi Irwan, San Francisco, CA (US); Ganesh B. Jampani, Gilroy, CA (US); Andy Sugiarto, Moraga, CA (US)

(73) Assignee: Xage Security, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,513

(22) Filed: Sep. 17, 2018

(65) Prior Publication Data
US 2019/0245852 A1   Aug. 8, 2019

Related U.S. Application Data

(63) Continuation of application No. 15/727,476, filed on Oct. 6, 2017, now Pat. No. 10,104,077.

(51) Int. Cl.
*H04L 29/06*        (2006.01)
*H04L 9/06*         (2006.01)
(Continued)

(52) U.S. Cl.
CPC ........ *H04L 63/0869* (2013.01); *G06F 21/445* (2013.01); *G06F 21/602* (2013.01);
(Continued)

(58) Field of Classification Search
USPC ........ 713/169, 150, 163, 181; 726/2, 21, 36; 380/255, 264, 276
See application file for complete search history.

(56) References Cited

U.S. PATENT DOCUMENTS

| | | | |
|---|---|---|---|
| 2009/0031138 A1* | 1/2009 | Nakhjiri | H04L 63/08 713/181 |
| 2011/0167250 A1* | 7/2011 | Dicks | A61B 5/1112 713/2 |
| 2017/0302641 A1* | 10/2017 | Ramatchandirane | H04L 63/0421 |

OTHER PUBLICATIONS

The International Searching Authority, "Search Report" In application No. PCT/US18/52843, dated Oct. 24, 2018, 8 pages.
(Continued)

*Primary Examiner* — Sharif E Ullah
(74) *Attorney, Agent, or Firm* — Hickman Palermo Becker Bingham LLP

(57) ABSTRACT

In an embodiment, a computer-implemented method comprises: in response to receiving a first authentication request from one or more first computing devices, authenticating the first computing devices on behalf of a first client device using a first set of identity information; in response to authenticating the first computing devices, generating and queuing a first set of one or more transactions corresponding to at least one of the one or more first computing devices; in response to receiving a second authentication request from the first client device configured to access the first set of one or more transactions, authenticating the first client device on behalf of a second computing device using a second set of identity information that is associated with the first client device; in response to performing the second authentication service, encrypting and sending the first set of one or more transactions to the first client device.

20 Claims, 7 Drawing Sheets

(51) Int. Cl.
    *H04L 9/30*     (2006.01)
    *H04L 29/08*     (2006.01)
    *G06F 21/60*     (2013.01)
    *G06F 21/44*     (2013.01)
    *H04W 4/70*     (2018.01)

(52) U.S. Cl.
    CPC .............. *H04L 9/0637* (2013.01); *H04L 9/30* (2013.01); *H04L 67/10* (2013.01); *H04W 4/70* (2018.02)

(56) References Cited

OTHER PUBLICATIONS

Current Claims in application No. PCT/US18/52843, dated Oct. 2018, 6 pages.

\* cited by examiner

ENABLING MULTITENANT DATA ACCESS ON A SINGLE INDUSTRIAL NETWORK

BENEFIT CLAIM

This application claims the benefit under 35 U.S.C. § 120 as a Continuation of application Ser. No. 15/727,476, filed Oct. 6, 2017, the entire contents of which is hereby incorporated by reference for all purposes as if fully set forth herein.

TECHNICAL FIELD

The technical field of the present disclosure relates to improved methods, systems, computer software, and/or computer hardware in the field of data security and access control regulation. The disclosure relates more specifically to improved computer-implement methods and systems for providing a single industrial network that enables multitenant data access using a gateway that supports multiple applications. Certain embodiments are useful in regulating access to data from internet of things (IoT) devices and improving the resistance of networked IoT devices to attacks, unauthorized or malicious use, or malware.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently permit IoT devices to be secured, yet readily usable. Key constraints in this technical field have included limited processing power, limited memory, and limited or absent user interface elements. All these characteristics of IoT devices make them difficult to integrate into existing client-server security systems. At the same time, misuse of IoT devices could be catastrophic by permitting an attacker or unauthorized user to gain control of industrial equipment or other systems that have embedded IoT devices.

Traditionally, client computing devices with internet access can connect to enterprise server computers, which provide identity and access management (IAM) services for managing, validating, and controlling user access. Almost without exception, networks that permit access from desktop computers or mobile computing devices of end users have placed all principal security apparatus at the server computer. For example, a user who wants access to an online account can use a computer with internet connectivity to access a website with a login page and input identity information, such as a username and password. Once a server computer validates the identity information, policies control the amount of access any particular device has so that the user can access their own account without accessing any other data.

This traditional approach requires a client device to have uninterrupted access to the internet for validation to occur. Moreover, implementing an authentication system that accommodates the applications used by different IoT devices presents yet another infrastructure challenge as a variety of different IoT devices become more widely-used. Different IoT devices are regulated and controlled by different software applications. Traditionally, the burden of accessing IoT devices using different applications is placed on the client device such at the client device would need to be programmed to accommodate every application used by the various enterprise devices. Often, a client device that needs access to a variety of IoT devices is required to download all the respective software applications necessary to access each device, which uses excessive storage space on the client device. Moreover, authentication is often handled by the downloaded application on the client device, which heavily strains the processing resources of the client device.

Thus, there is a need for a single authentication portal with multitenancy capabilities that can accommodate access to multiple devices.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
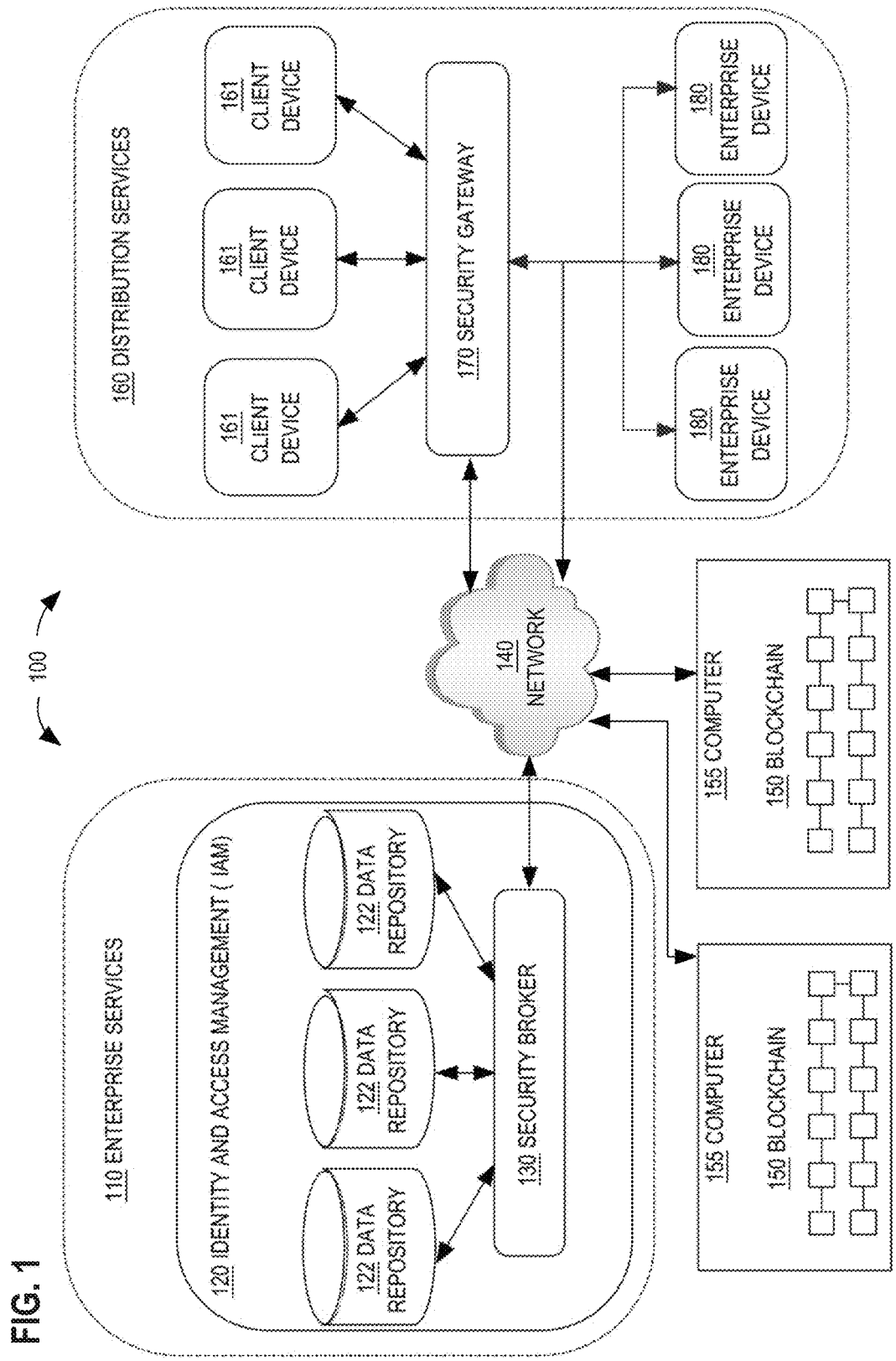
FIG. 1 illustrates a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
    2.0 STRUCTURAL OVERVIEW
        2.1 ENTERPRISE SERVICES
        2.2 BLOCKCHAIN ARCHITECTURE
        2.3 DISTRIBUTION SERVICES
    3.0 FUNCTIONAL OVERVIEW
        3.1 VIRTUAL IAM SERVICES 3.2 ENTERPRISE DEVICE AUTHENTICATION SERVICES
3.3 PERMISSIONS PROCESSING
3.4 AUDIT LOG AND VALIDATION
3.5 MULTITENANCY APPLICATION AUTHENTICATION SERVICES
3.6 SINGLE PORTAL
4.0 PROCEDURAL OVERVIEW
5.0 HARDWARE OVERVIEW 1.0 General Overview According to various embodiments, methods and systems are provided that enable improved computer and network efficiency and security by providing a single authentication portal for enterprise devices, client devices, as well as applications. The single authentication portal provides local identity and access management (IAM) services to client devices and applications on behalf of enterprise servers while authenticating to enterprise devices on behalf of the client devices and applications. Past approaches required connection from the client devices and applications to the enterprise server for authentication, after which the client devices and applications would connect directly to enterprise devices. With these past approaches, if the security of any enterprise device were compromised, the enterprise server may still be authorizing client devices to access the compromised device. However, the present approach utilizes an intermediary to authenticate devices and applications on behalf of the enterprise server and to authenticate to enterprise devices on behalf of devices and applications. This approach provides ways of monitoring the status of all client and enterprise devices, detecting security breaches, and flagging suspicious activities. This approach has the benefit of decreasing the use of processing resources and network traffic for enterprise servers by moving IAM services to the intermediary, decreasing the use of processing resources for client devices that are no longer responsible for enacting policies on themselves, and increasing resistance against malicious attacks on sensitive data using audit logs, data validation, and blockchains. Moreover, the present approach can be extended to a plurality of IoT devices that are geographically distributed and separate from the enterprise environment, without implementing resource-intensive security software on or at each IoT device.

In an embodiment, a computer-implemented method comprises receiving a first authentication request from one or more first computing devices; in response to receiving the first authentication request, performing a first authentication service for the one or more first computing devices on behalf of a second computing device using a first set of identity information; in response to performing the first authentication service, generating and queuing a first set of one or more transactions corresponding to at least one of the one or more first computing devices; receiving a second authentication request from the second computing device configured to access the first set of one or more transactions; in response to receiving the second authentication request, performing a second authentication service for the second computing device on behalf of a third computing device using a second set of identity information; in response to performing the second authentication service, encrypting and sending the first set of one or more transactions to the second computing device.

2.0 Structural Overview

FIG. 1 illustrates a networked computer system. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

FIG. 1 illustrates only one of many possible arrangements of components configured to execute the programming described herein. Other arrangements may include fewer or different components, and the division of work between the components may vary depending on the arrangement. In the example of FIG. 1, a networked computer system 100 may facilitate the secure exchange of data between programmed computing devices providing enterprise services 110, devices providing distribution services 160, and devices of a blockchain 150. Therefore, each of elements 110, 155, 160 of FIG. 1 may represent one or more computers that host or execute stored programs that provide the functions and operations that are described further herein in connection with enterprise services, distribution services and blockchain operations. The methods and systems describe herein may be designed to accommodate a variety of different enterprises. Each enterprise may have its own security broker 130, blockchain 150, and/or security gateway 170 with settings that are customized to the preferences of each enterprise.

2.1 Enterprise Services

Enterprise services 110 may be services that are programmatically offered by an enterprise, including identity and access management (IAM) 120 services. Typically, such services are delivered by executing control programs or application programs on computers and processing and responding to requests of client computing devices using client-server digital message communications over networks based on defined protocols. IAM 120 services may enable devices, such as enterprise servers, to manage, validate, and control device and user access for any of a plurality of geographically distributed computing devices, including but not limited to IoT devices.

Enterprise servers and other enterprise computing devices are often heavily protected to ensure data security and prevent malware breaches. Traditionally, when a device requests access from an enterprise server, the enterprise server may go through a validation process that is managed using programs executed in cooperation by the enterprise server and device. The validation process may include authentication, authorization, and accounting of users, applications, and/or devices. Access control policies defined by the enterprise server may determine which users, applications, and/or devices will have access to what types of data.

Instead of this traditional approach, one embodiment of the current approach implements a validation process not at the enterprise server but using a security gateway 170, as further described herein, with significant technical benefits and improvements over past practice.

In an embodiment, the access control policies may be stored in a data repository 122 associated with the enterprise server and updated according to enterprise needs. Consequently, a central control point associated with an enterprise can maintain control of security policy, while IAM 120 services or other functions are executed closer to protected IoT devices, for example. Identity information associated with users, applications, and/or devices may also be stored in data repository 122. Identity information may include, for example, usernames, passwords, and their corresponding access control policies.

Security broker 130 may be a computer, software and/or hardware or a combination storing instructions that are programmed or configured to access identity information stored in the data repository 122 and detect changes to the identity information. The security broker 130 may copy the identity information locally in a cache, hash and encrypt the identity information, and send the information over a network 140 to a blockchain 150.

Network 140 broadly represents a combination of one or more local area networks, wide area networks, global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 140 and the disclosure presumes that all elements of FIG. 1 are communicatively coupled via network 140.

While each of the components listed above is illustrated as if located on a single computer, one or more of the components listed above may be part of and/or executed on different computers. For example, data repository 122 may be may be located on the same or a separate computer from another data repository 122. As another example, data repository 122 may be storage drives coupled to an enterprise server.

2.2 Blockchain Architecture

The blockchain 150 may comprise blocks of linked data that are stored in an interconnected network of computers, with suitable stored programs at those computers to support ordered creation and transmission of blockchain data. Blockchain 150 forms a distributed database that maintains a continuously growing list of ordered records termed blocks that are timestamped and linked to a previous block. Each block in the series of blocks is linked together chronologically, with each new block containing a hash of the previous block. Each computer 155, or node, in a network of computers may store the entire record of linked data blocks. This creates a consensus network of computers that can verify the integrity of each block of data and the integrity of the entire blockchain 150. The consensus network has the benefit of having a high Byzantine fault tolerance, which is the ability of a computing system to tolerate Byzantine failures. As a result, the blockchain 150 functions as a distributed database that ensures the integrity of the data by utilizing hash functions to link each block to its previous block and storing the entire record of data blocks at each node.

2.3 Distribution Services

Distribution services 160 may be computer-implemented services that are configured or programmed for distributing IAM services locally to a client device 161 and authenticating to an enterprise device 180. A client device 161 may be a computer, a virtual computer, and/or a computing device. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The client device 161 may be computer network devices such as gateways, modems, routers, wireless access points, switches, hubs, and firewalls. The client device 161 may also be other IoT devices, which are physical devices with network connectivity capabilities that enables these physical devices to collect and exchange data. The client device 161 may also be specific users using a computer or IoT device. The client device 161 may also be applications running on a computer or IoT device.

Security gateway 170 may be a computer, software and/or hardware or a combination storing instructions configured to perform virtual IAM services locally with or without uninterrupted internet access. The security gateway 170 may access identity information stored in the blockchain 150, detect changes to blockchain 150 data and update a local data repository with the updated access identity information, as further described herein. Client device 161 may connect to the security gateway 170 so that the security gateway 170 may perform virtual IAM services for client device 161 locally using the identity information stored in a data repository associated with the security gateway 170. Performing virtual IAM services for client device 161 may occur with or without access to the network 140. The security gateway 170 may also store client device information in a separate data repository and periodically update the blockchain 150 with the stored information. In one embodiment, the security gateway 170 may be a separate device or program from the enterprise device 180, or it may be programmed to run inside the enterprise device 180 given adequate computing resources.

Enterprise device 180 may be a computer, a virtual computer, and/or a computing device. A computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. The enterprise device 180 may be computer network devices such as gateways, modems, routers, wireless access points, switches, hubs, and firewalls. The enterprise device 180 may also be other IoT devices, which are physical devices with network connectivity capabilities that enables these physical devices to collect and exchange data. The enterprise device 180 may also be specific users using a computer or IoT device. The enterprise device 180 may also be applications running on a computer or IoT device.

3.0 Functional Overview

It will be apparent that the security gateway 170 represents a converged set of different technology foundations that have been combined in a new way. In an embodiment, the security gateway 170 provides an intermediary between the client device 161 and the enterprise device 180. One purpose of the security gateway 170 is to provide local, virtual IAM services without the need for client device 161 to connect to the internet and access enterprise servers that would otherwise perform these IAM 120 services. Another purpose of the security gateway 170 is to authenticate to an enterprise device 180 on behalf of the client device 161. The security gateway 170 also functions to associate user accounts with permission levels for each enterprise device 180 and track transactions between the client device 161 and enterprise 180 for auditing and validation purposes. Thus, the security gateway 170 functions as a single portal for authenticating, regulating, and tracking client device 161 access to the enterprise device 180, and for detecting potential security breaches of the enterprise device 180, as further described in other sections herein.

3.1 Virtual IAM Services

Figure 2:
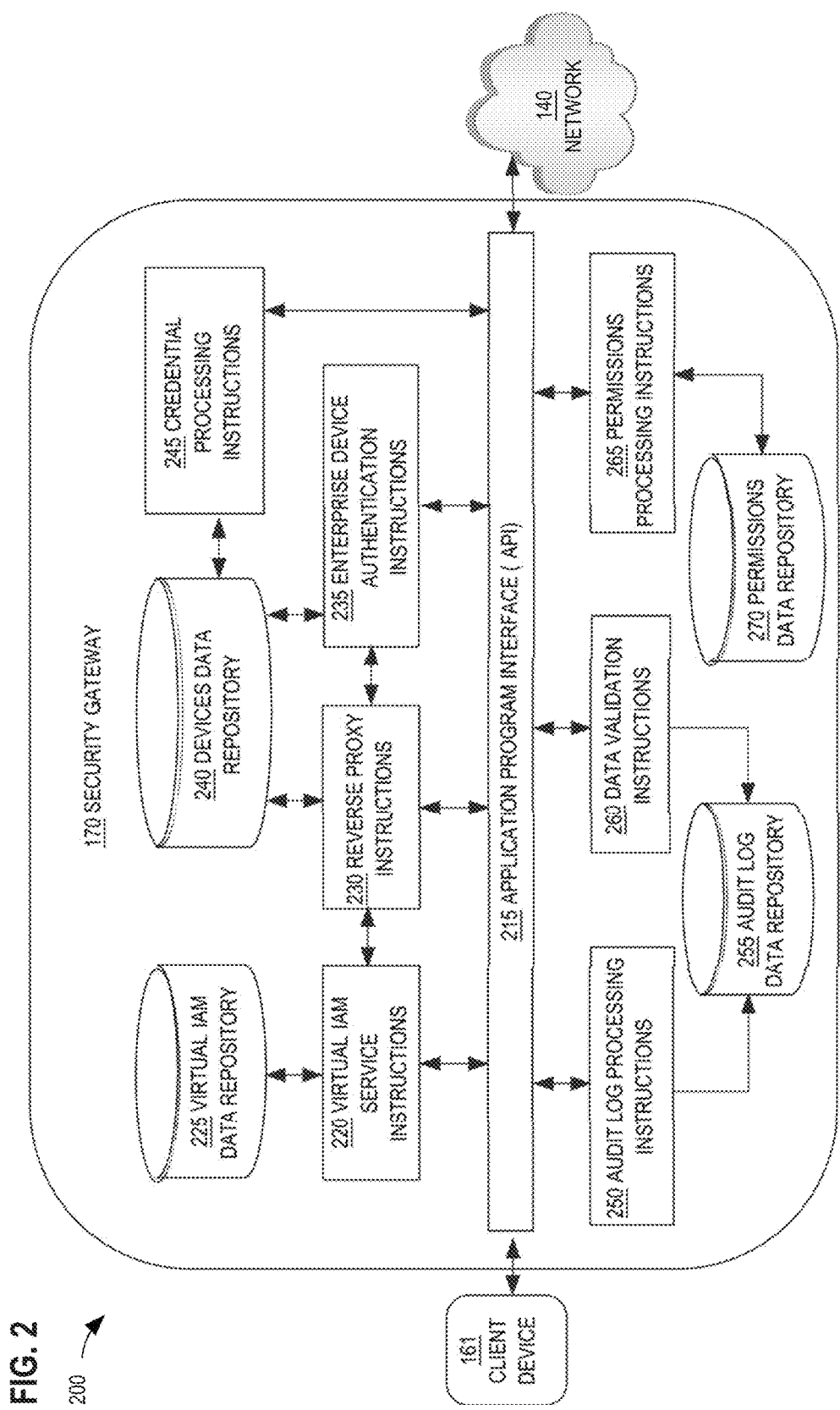
FIG. 2 illustrates a security gateway, in an example embodiment.

FIG. 2 illustrates a security gateway in an example embodiment. Security gateway 170 may be a computer, software and/or hardware or a combination storing instructions and/or databases that detect, store, and utilize identity information for local authentication services with or without internet access. Specifically, the security gateway 170 may comprise programmed instructions that implement an Application Program Interface (API) 215 that defines program functions that a client device 161 may call to connect to the security gateway 170. The API 215 may be, for example, a representational state transfer (REST) API integrated with an HTTP server so that RESTful API calls can be issued in parameterized URLs over HTTP from the client device 161 to the API 215. In one embodiment, a client device 161 connected to the gateway through the API 215 may be validated using the virtual IAM service instructions 220. The virtual IAM service instructions 220 may perform virtual IAM services for connected client device 161 locally using the identity information stored in the virtual IAM data repository 225.

Performing virtual IAM services for client device 161 may occur with or without access to the network 140. For example, while the security gateway 170 is offline, the virtual IAM service instructions 220 may, despite the lack of internet access, parse the virtual IAM data repository 225 for identity information and use the identity information to authenticate client device 161. A technical benefit of this approach is that validation services may occur without the constant need for internet connectivity. Instead, validation services may be provided locally through an intranet or other local networking facility.

Once client device 161 is authenticated, the API 215 may present a list of each enterprise device 180 that an authenticated client device 161 is authorized to access based on an access control list maintained at the enterprise server. The access control list may also be stored as a mapped permissions list at the security gateway 170, as further describe herein. A user may then select a particular enterprise device 180 to access.

3.2 Enterprise Device Authentication Services

Certain enterprise devices may require local authentication in order to grant access. For example, small wind turbines may have factory default credentials hard-coded in flash memory or other non-volatile storage. To access the turbine, the factory default credentials are entered and then subsequently changed to custom credentials for security purposes. Thereafter, the custom credentials must be provided in order to access the turbine. In an embodiment, the security gateway 170 may act in place of the client device 161 in setting up credentials, storing those credentials for local authentication with the enterprise device 180, and rotating the credentials for increased security.

In one embodiment, credential processing instructions 245 may be programmed to generate credentials for accessing the enterprise device 180 on behalf of the client device 161. The credentials may be, for example, a service account and password for the security gateway 170. Once credentials are generated, they may be stored in a devices data repository 240. The enterprise device authentication instructions 235 may use the credentials stored in the devices data repository 240 to authenticate to the enterprise device 180. The credential processing instructions 245 may also rotate credentials for each enterprise device 180 to increase security. Specifically, rotating credentials involves performing a series of steps to generate new credentials and delete old ones so that, in the event of an undetected security breach, the credentials will only be available to the malicious attacker for a limited period of time before they are changed. The frequency of rotation may be customizable and based on days, weeks, months, years or any other incremental period of time. Further details are provided herein in other sections.

In an embodiment, a user of an authenticated client device 161 has selected a particular enterprise device 180 to access, then in response, the security gateway 170 is programmed to use enterprise device authentication instructions 235 in association with the reverse proxy instructions 230 to authenticate to the enterprise device 180 on behalf of the client device 161. The enterprise device authentication instructions 235 may be programmed to use the credentials stored in the devices data repository 240 in association with the particular enterprise device 180 to authenticate to the enterprise device 180 while the reverse proxy instructions 230 proxies the request. The reverse proxy instructions 230 may be programmed to use a dynamic configuration so that there is no down time for adding a new enterprise device 180 or changing the credentials.

In an embodiment, if the security gateway 170 properly authenticates to the enterprise device 180, then client device 161 may access the enterprise device 180 under program control. However, if the security gateway 170 does not properly authenticate to the enterprise device 180, then the security gateway may be programmed to mark the enterprise device as compromised, such that the security gateway will no longer accept or pull data from the enterprise device, as further described herein.

3.3 Permissions Processing

Access to various IoT devices may be regulated through the use of different permission levels, such as root, administrative, read-write, and read-only levels. The security gateway 170 may be configured to regulate an authenticated user or authenticated device's access to a particular IoT device based on predetermined permission levels associated with roles or permissions such as "admin" or "user". For example, a client device 161 may connect to the security gateway 170, which provides virtual IAM services on behalf of the enterprise server. A user account may be associated with the client device 161.

Once the client device 161 has been validated using the user account, security gateway 170 may be programmed to limit the ability of the client device 161 to access an enterprise device 180 based on the access control list maintained at enterprise servers. The permissions processing instructions 265 may be programmed to retrieve the access control lists maintained at the enterprise servers and generate a local permissions list. The local permissions list may be, for example, a Role Based Access Control (RBAC) list that maps each user account associated with any client device 161 to a particular role or permission for every enterprise device 180 to which the user account is granted access. In an example embodiment, the RBAC list may also map groups of user accounts to roles for one enterprise device 180 or a group or groups of enterprise devices.

In an example embodiment, a first user account associated with a first client device 161 may be designated "admin" in the access control lists for each of three different enterprise devices, and therefore, given administrative privileges to the first enterprise device 180, the second enterprise device 180, and the third enterprise device 180. A second user account associated with a second client device 161 may be designated a "user" in the access control list for each of the three different enterprise device, and therefore, given read-write privileges to the first enterprise device 180, the second enterprise device 180, and the third enterprise device 180. A third user account associated with a third client device may be designated an "admin" for the first enterprise device 180 and the second enterprise device 180 based on the access control lists for each of those devices, but may also be designated a "user" for the third enterprise device 180. In this case, the permissions processing instructions 265 are programmed to retrieve each access control list associated with each of the enterprise devices. The permissions processing instructions 265 may be programmed to generate a local permissions list that maps the third user account to administrative privileges for the first enterprise device 180 and the second enterprise device 180, but limited user access to the third enterprise device 180. This local permissions list may be stored in a permissions data repository 270.

3.4 Audit Log and Validation

Since the security gateway 170 may be programmed to act as an intermediary between the client device 161 and the enterprise device 180, it is logically positioned to track packets, segments, flows or other communications for all transactions to and from all IoT devices. The audit log processing instructions 250 may be programmed to record, for example, a timestamp, an actor, an operation/transaction, a severity, and a status of any activities processed by the security gateway 170 and generate an audit log for tracking and security purposes. An audit log may be an individual transaction entry or it may be a series of transaction entries presented in cleartext.

The audit log processing instructions 250 may generate single audit log entry as each transaction occurs or it may generate audit logs comprising multiple entries at certain periods of time. The types of data recorded and featured in the audit log, as well as the frequency at which audit logs are generated may be specified in configuration data or programmed. The specific types of actors, operations/transactions, severity, and statuses are also customizable. The following is an example of an audit log that may be generated:

| Timestamp | Actor | Operation/Transaction | Severity | Status |
|---|---|---|---|---|
| T1 | User: John Smith | Login attempt | Info | Successful |
| T2 | Device: Temp Sensor 1 | Posting data | Info | Approved |
| T3 | Device: IP Camera 1 | Login attempt | Alert | Fail attempts - 5 times |
| T4 | Device: IP Camera 2 | Data Stream | Alert | Outage |

In the example above, the audit log features four (4) entries. The Timestamp column features T1 through T4, which represent different times during which a transaction was recorded. The time may be recorded by the hour, minute, and/or second. In addition to the Timestamp, the audit log may be configured to record additional information, such as the date. The Actor column features each actor that initiated an event or activity. An actor may be any IoT device, such as a client device 161 or an enterprise device 180, and may be recorded as the name of a user, an account associated with a user, the name of a device, an account associated with a device, an Internet Protocol (IP) address, a Media Access Control (MAC) address, or any other form of identification. The Operation/Transaction column features operations, transactions, events, inputs, and/or activities conducted by the actor, such as a login attempt, posting data, or streaming data.

The specific types of activities that are recorded may be customized based on the functionality of the enterprise device 180 and what the actor does. For example, if a client device 161 accesses a particular enterprise device 180 that records sensor data in order to download the data, the activity recorded by the audit log may be "downloading data."

The Status column features a status of each Operation/Transaction, such as indicating whether a login was successful and whether the posting of certain data was approved. The Severity column features an indicator for each Operation/Transaction, such as an alert for flagging unusual activities. The alerts can be customized to track activities that may indicate a potential security risk. In the example above, an alert is recorded and sent for five failed login attempts to IP Camera 1.

The audit log processing instructions 250 may be programmed to record and send an alert after any number of failed login attempts, such as six, four, or three. Since the security gateway 170 has attempted and failed to authenticate to IP Camera 1 five times, IP Camera 1 may have been compromised by a malicious attack. As a result, the audit log processing instructions 250 has recorded the event in the audit log and generated an alert. The alert may cause the security gateway 170 stop accepting or pulling data from IP Camera 1.

An audit log generated by the audit log processing instructions 250 may be stored in the audit log data repository 255. In one embodiment, the audit log data repository 255 may be located at the security gateway 170 and managed by a third party on behalf of the enterprise. In another embodiment, the audit log data repository 255 may be located outside the security gateway 170 and managed by the enterprise. The audit log data repository 255 may also be distributed and replicated across the enterprise system, in an embodiment. Any combination of audit log data repository 255 locations and management may be used.

Upon delivery to the audit log data repository 255, the audit log processing instructions 250 may calculate a hash, or hash value, of the audit log. For example, a hash function, such as an MD5 or any other cryptographic hash function, may map each audit log to a hash, or index, such as an MD5 hash. The hash may act as a numerical representation of each audit log. Any hash function, as understood in the art, may be used. The hash may then be recorded to the blockchain 150.

The blockchain 150 functions as a decentralized digital ledger that tracks numerous entries. Copies of the entire blockchain may be stored at each computer 155, or node, in a distributed network of interconnected computers of which FIG. 1 illustrates computer 155 with blockchain 150. In an embodiment, proposed entries to the blockchain 150 may be checked by a majority of the computers for verification. For example, if a new entry is generated for storage in the blockchain 150, the network of interconnected computers that also store copies of the blockchain 150 would first run algorithms to evaluate the hash value and verify the validity of the entry. If a majority of the computers agree that the entry is valid, then the entry will be added as a new block in the blockchain 150. As a part of a consensus network, blockchain 150 enforces high Byzantine fault tolerance; for example, a malicious attack attempting to alter the information in the blockchain 150 would need to control over 50% of the computers in the consensus network to alter the consensus. Since it would be exceedingly difficult to maliciously attack and maintain control over that many computers, the blockchain 150 data is better protected against malicious attacks than traditional methods of data storage.

The security gateway 170 may also have data validation instructions 260 as an added security measure, which validate the integrity of the audit logs. In one embodiment, the data validation instructions 260 may apply the same previously used hash function to the audit logs stored in the audit log data repository 255 and compare that hash with the hash of the audit log stored in the blockchain 150. Any changes to the audit log stored in the audit log data repository 255 would change the hash, thereby creating differences in the hash from the audit log data repository 255 compared to the hash from the blockchain 150. If the current hash matches the hash stored in the blockchain 150, then no changes have been made. However, if the current hash does not match the hash stored in the blockchain 150, then changes to the audit logs have been made. Thus, the data validation instructions 260 provides increased security by validating that the audit logs have not been tampered with.

3.5 Multitenancy Application Authentication Services

In another embodiment, the security gateway 170 may act as a single authentication portal for a variety of software applications. Since the security gateway 170 authenticates to multiple enterprise devices, many of which use a variety of different applications to send and receive data, the security gateway 170 may also support each of these applications and provide authentication services for each of these applications. Therefore, the security gateway 170 may provide multitenant data access on a single authentication portal.

Figure 3:
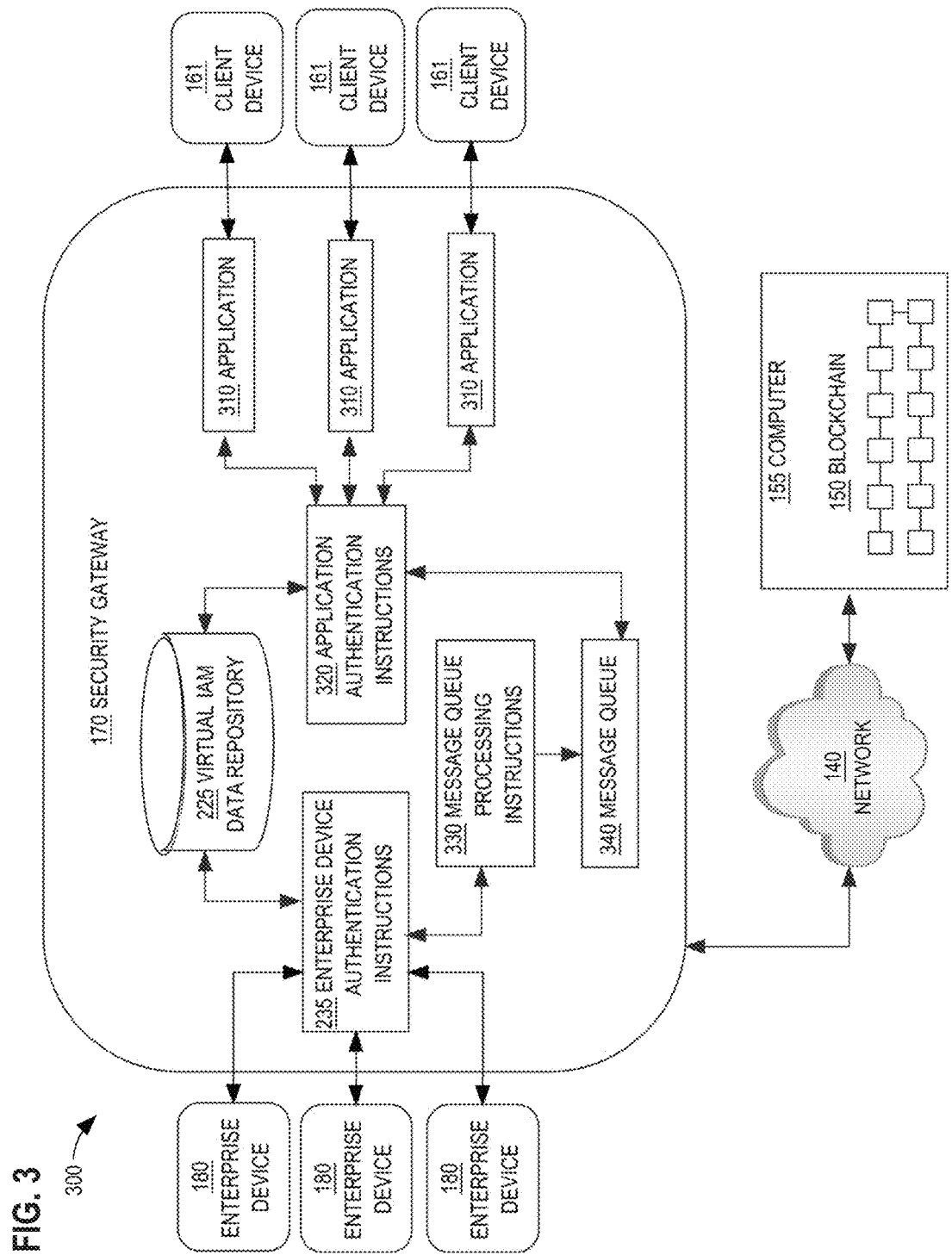
FIG. 3 illustrates a multitenancy security gateway system, in an example embodiment.

FIG. 3 illustrates a multitenancy security gateway system, in an example embodiment.

In the example of FIG. 3, the security gateway 170 may be programmed to use enterprise device authentication instructions 235 to access the devices data repository 240 and authenticate an enterprise device 180, as previously discussed herein. The enterprise device 180 may be, for example, a camera, temperature sensor, meter, or any other IoT device. Once authenticated, the enterprise device 180 may send a recorded transaction, represented by time series data in the form of a timestamp-value pair, to the security gateway 170 for processing and queuing, in an embodiment. For example, a temperature sensor may send temperature measurement and an associated time at which the temperature was recorded to the security gateway 170. Subsequently, the security gateway 170 may use message queue processing instructions 330 to queue the time series data captured from each authenticated enterprise device 180 in a message queue 340.

A client device 161 may access the enterprise device 180 or the stored time series data from the message queue 340 using a software application once the application has been authenticated. In embodiment, the security gateway 170 may run an application 310 configured to access the enterprise device 180 or the stored time series data. The client device 161, running an edge application that corresponds to the application 310 running on the security gateway 170, may communicate with the application 310 to request authentication. The edge application may be a programmable user interface that allows user input of identity information. Subsequently, the security gateway 170 may use application authentication instructions 320 to access the virtual IAM data repository 225, or another data repository storing application-based identity information for authentication, and authenticate the application 310 using the identity information received through the edge application. Therefore, authentication occurs at the security gateway 170 such that the use of client device processing resources is reduced. In an embodiment, the edge application may be, for example, an autonomous application running at the edge with pre-provisioned authentication token(s). The security gateway 170 may validate the pre-provisioned authentication tokens(s) without the need for user input.

In an embodiment, the authentication process may regulate which time series data may be accessed by which application 310. Each application 310 may be enterprise-specific such that it may only access one or more time series data belonging to a particular enterprise. For example, a hypothetical enterprise named Associated General Enterprises (AGE) may have their own software application for a AGE camera. The security gateway 170 may support a AGE application 310 that enables a client device 161 to access only the AGE time series data from the AGE camera. In an embodiment, each enterprise device 180 and each corresponding application 310 may have an enterprise identifier (ID) comprising a value that uniquely signifies or identifies the particular enterprise. Upon enterprise device authentication, the message queue processing instructions 330 may map time series data coming from the enterprise device 180 to the enterprise ID of that enterprise device 180. Upon application authentication, the application authentication instructions 320 may be programmed to identify the enterprise ID associated with the application 310 and enable access only to time series data that has been mapped to that specific enterprise ID. By controlling access through these enterprise-specific applications, the security gateway 170 may ensure that sensitive information is secure and accessible only to those devices running applications that have been authenticated.

In an embodiment, the authentication process may also regulate which time series data may be accessed by which users. For example, the security gateway 170 may use the permissions processing instructions 265 of FIG. 2 to retrieve the access control lists maintained at the enterprise servers and generate a local permissions list. The local permissions list may be, for example, a RBAC list that maps each user to a particular role or permission for every time series data to which the application 310 is granted access. The RBAC list may be used in tandem with enterprise ID to determine which users may access which specific devices belonging to an enterprise.

For example, a user using an AGE-specific application 310 to access AGE devices may have administrator privileges to an AGE camera but no access to an AGE temperature sensor. A different user may have, for example, administrator privileges to both the AGE camera and the AGE temperature sensor. In an embodiment, the RBAC list may also map groups of users to roles for an enterprise device 180 or a group or groups of enterprise devices.

Once authentication has occurred, the application 310 may access the enterprise device 180 or the message queue 340 and acquire the time series data that the application 310 is allowed access to. When acquiring time series data from the message queue 340, the application 310 may encrypt the time series data using, for example, the Public Key Infrastructure (PKI) model, or public key encryption, where the application 310 has the public key for encryption and the client device 161 has the private key for decryption. The PKI encryption and decryption provides for data security in ensuring that the time series data is not compromised before it is received by the client device 161.

3.6 Single Portal

Figure 4:
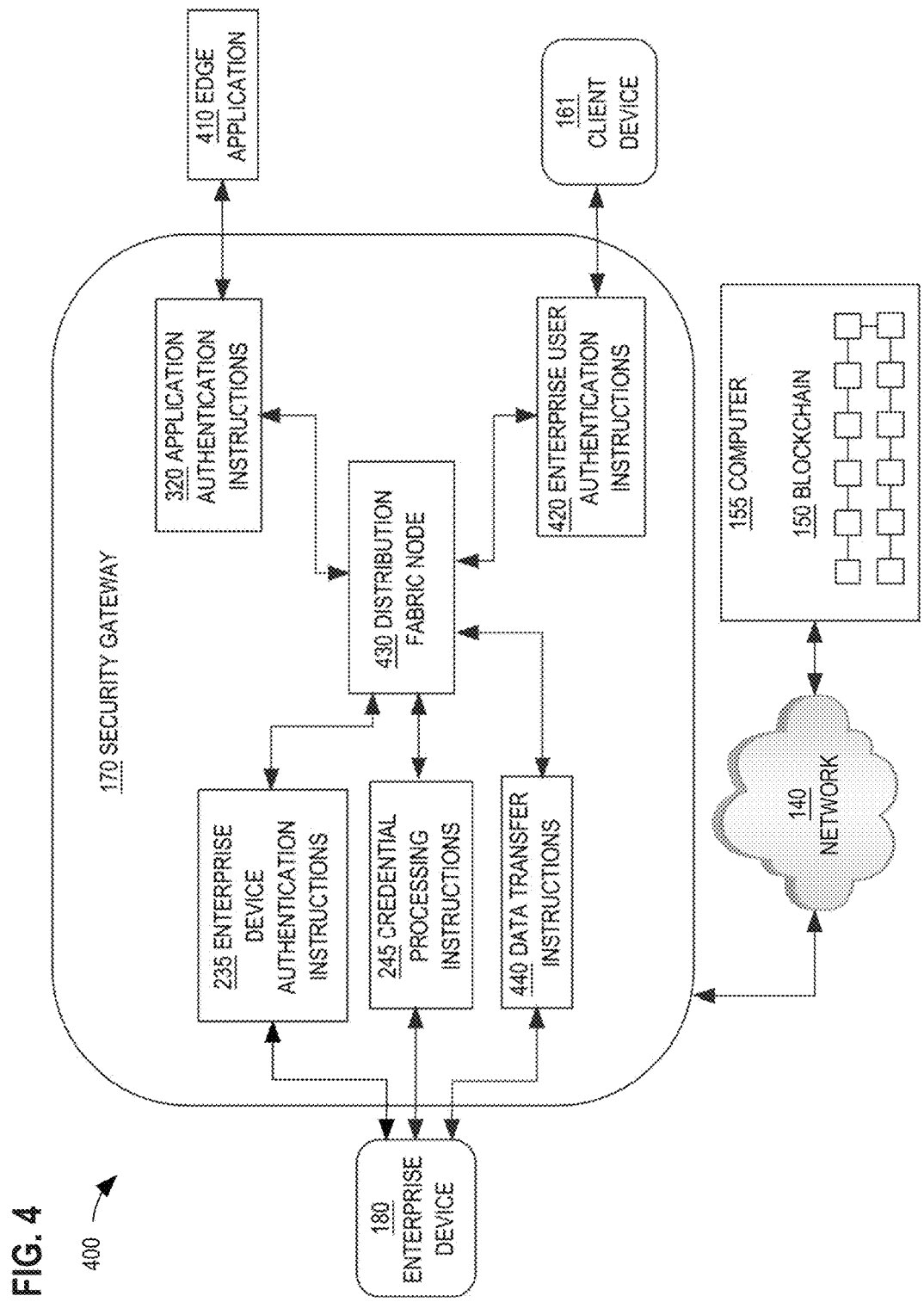
FIG. 4 illustrates a security gateway system, in an example embodiment.

FIG. 4 illustrates a security gateway system, in an example embodiment. The example of FIG. 4, the security gateway 170 may act as a single portal for enterprise devices, users, applications, and data. Specifically, the security gateway 170 may be programmed for enrolling IoT devices and rotating credentials, authenticating enterprise devices, applications, and client devices, supporting multi-tenancy for applications, as well as controlling and distributing data across different platforms and protocols.

In an embodiment, the security gateway 170 may be programmed with application authentication instructions 320 that access the virtual IAM data repository 225, or another data repository storing application-based identity information for authentication, and authenticate the application 310 using information received through the edge application 410. The application authentication instructions 320 may authenticate a variety of applications from different enterprises and allow user access only to specific enterprises based on, for example, an enterprise ID stored in the virtual IAM data repository 225 or another data repository that stores application-based identity information.

In another embodiment, the security gateway 170 may be programmed with enterprise user authentication instructions 420, such as virtual IAM service instructions 220, that access the virtual IAM data repository 225 and authenticate a client device 161 that is accessing the security gateway 170 through a user interface means other than an application, such as through a web browser. The enterprise user authentication instructions 420 may also regulate user access based on local permissions list stored in a permissions data repository 270, for example.

In another embodiment, the security gateway 170 may be programmed with enterprise device authentication instructions 235 that access the virtual IAM data repository 225 and authenticate an enterprise device 180 using credentials stored in the devices data repository 240, as further discussed herein.

In an embodiment, the security gateway 170 may also be programmed with credential processing instructions 245 that generate credentials for accessing the enterprise device 180 on behalf of the client device 161. The credentials may be, for example, a service account and password for the security gateway 170. Once credentials are generated, they may be stored in a devices data repository 240. The enterprise device authentication instructions 235 may use the credentials stored in the devices data repository 240 to authenticate to the enterprise device 180. The credential processing instructions 245 may also rotate credentials for each enterprise device 180 to increase security. Specifically, rotating credentials involves performing a series of steps to generate new credentials and delete old ones so that, in the event of an undetected security breach, the credentials will only be available to the malicious attacker for a limited period of time before they are changed. The frequency of rotation may be customizable and based on days, weeks, months, years or any other incremental period of time. Further details are provided herein in other sections.

In another embodiment, the security gateway 170 may be programmed with data transfer instructions 440 that work in conjunction with the enterprise device authentication instructions 235, application authentication instructions 320, and the enterprise user authentication instructions 420. Once an application 310 or client device 161 has been authenticated, and an enterprise device 180 has been authenticated, an application 310 or client device 161 may access the enterprise device 180 directly, or access data from the enterprise device 180 that has been stored locally in the security gateway 170. The data may be stored in a message queue 340, for example. The data transfer instructions 440 may be message queue processing instructions 330, in an embodiment, or any other instructions that transfer data from the enterprise device 180 to the security gateway 170 for regulated distribution only to users, applications, and/or client devices that are authorized to access the data.

In an embodiment, the security gateway 170 may be programmed with a distribution fabric node 430, which is a node that regulates distribution of information between the various interconnected devices. In this embodiment, the application authentication instructions 320, enterprise user authentication instructions 420, enterprise device authentication instructions 235, credential processing instructions 245, and data transfer instructions 440 all interconnect to the distribution fabric node 430 such that data may be received, processed, forwarded, and/or stored accordingly.

Therefore, the security gateway 170 may act as a central authentication and access regulation point for data, devices, applications, and users such that data may be exchanged securely between various devices.

4.0 Procedural Overview

Figure 5A:
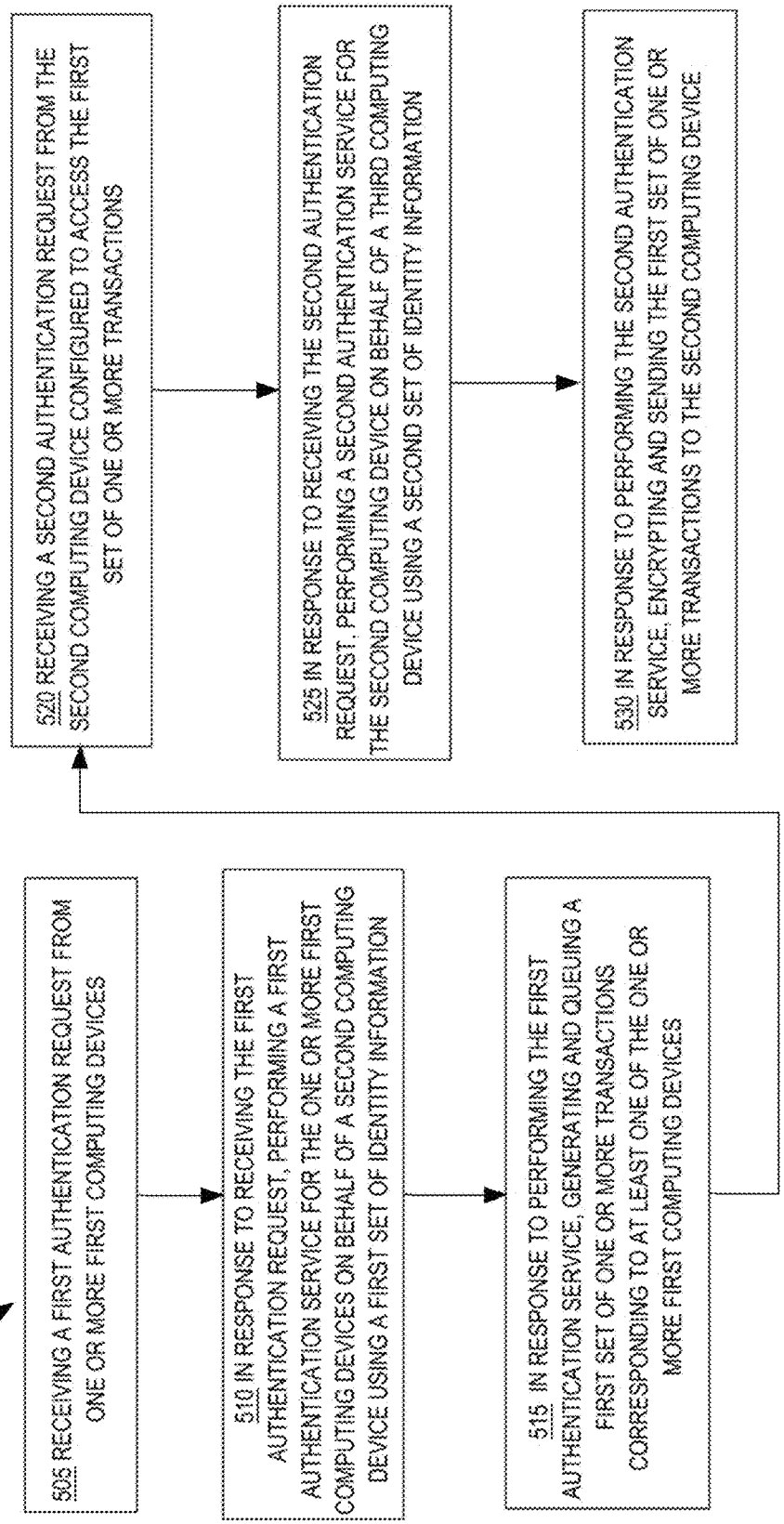
FIG. 5A and FIG. 5B illustrate algorithms or methods for providing multitenancy authentication services, in an example embodiment.
Figure 5B:
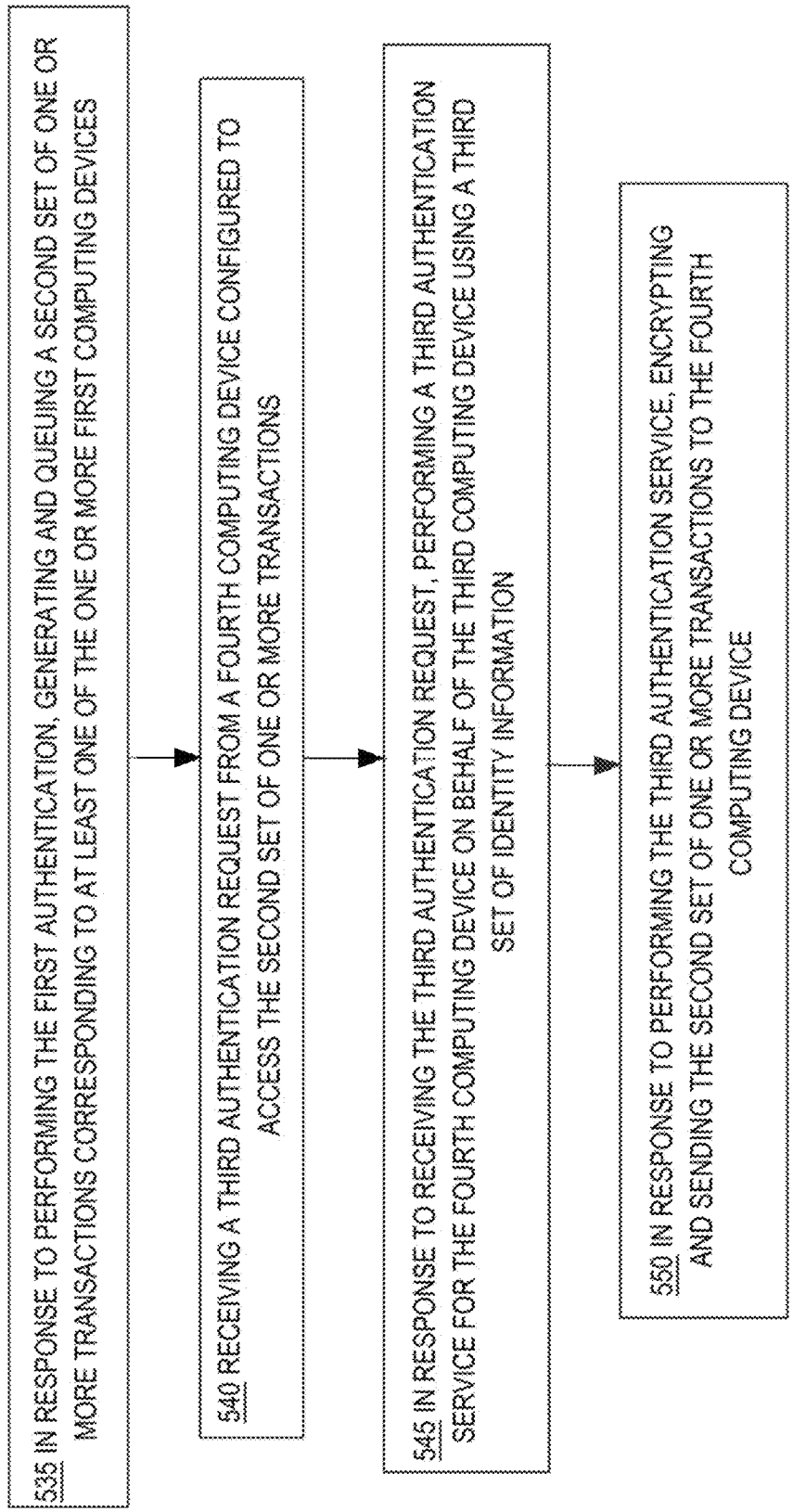

FIG. 5A and FIG. 5B illustrate algorithms or methods 500 for providing multitenancy authentication services, in an example embodiment. FIG. 5A and FIG. 5B may be used as a basis to code one or more computer programs or other software elements that the security gateway 170 executes or hosts. In an embodiment, using the approaches of this section, security gateway 170 offers virtual IAM services in place of enterprise servers that would otherwise need to provide authentication services to client devices and applications. The security gateway 170 also acts in place of client devices and applications by authenticating to enterprise devices on behalf of the client device 161 and application 310.

At step 505 of FIG. 5A, a method comprises receiving a first authentication request from one or more first computing devices. In an embodiment, the security gateway 170 receives an authentication request from an enterprise device 180. The enterprise device 180 may be a camera, temperature sensor, meter, or any other IoT device, for example. The enterprise device 180 may also be pre-programmed with an enterprise ID that is specific to the enterprise.

At step 510, in response to receiving the first authentication request, the method further comprises performing a first authentication service for the one or more first computing devices on behalf of a second computing device using a first set of identity information. In an embodiment, the security gateway 170 authenticates an enterprise device 180 on behalf of a client device 161 that may subsequently access the enterprise device 180 or time series data from the enterprise device 180. Performing the first authentication services may comprise using enterprise device authentication instructions 235 to access the devices data repository 240 where credentials or identity information for accessing the enterprise device 180 is stored, and authenticating the enterprise device 180 based on the identity information. In an embodiment, the identity information for the enterprise device 180 may include an enterprise ID which identifies the enterprise that the specific device is associated with. In another embodiment, a plurality of enterprise devices may be authenticated. The plurality of enterprise devices may all be associated with one specific enterprise, or they may be associated with different enterprises.

At step 515, in response to performing the first authentication service, the method further comprises generating and queuing a first set of one or more transactions corresponding to at least one of the one or more first computing devices. In an embodiment, once the security gateway 170 authenticates the enterprise device 180, the security gateway may be programmed with message queue processing instructions 330 that obtain a set of one or more transactions that occurred at the enterprise device 180 and queue the transactions in a message queue 340. The security gateway 170 may obtain transactions from any number of enterprise devices associated with one or more enterprises.

For example, the enterprise device 180 may be a temperature sensor that records temperature measurements at particular times. The temperature sensor may belong to AGE, as an example enterprise. The transaction or operation may be a value, such as the temperature, and an associated timestamp. The transaction may be recorded as a timestamp-value pair, in an example embodiment. The set of one or more transactions may comprise a single timestamp-value pair or a series of timestamp-value pairs. The process of queuing the first set of one or more transactions may comprise queuing the one or more transactions in the message queue 340 in chronological order until the transactions are ready to be received.

At step 520, the method further comprises receiving a second authentication request from the second computing device configured to access the first set of one or more transactions. In an embodiment, the security gateway 170 may receive an authentication request from a client device 161 that is configured to access the set of one or more transactions in the message queue 340 once the device has been authenticated. For example, the client device 161 may send an authentication request to the security gateway 170 via a web browser or an edge application 410 running on the client device 161.

At step 525, in response to receiving the second authentication request, the security gateway 170 may perform a second authentication service for the client device 161 on behalf of an enterprise server using a second set of identity information. In an embodiment, the enterprise user authentication instructions 420 or virtual IAM service instructions 220 may authenticate a user or client device 161 using identity information stored in the virtual IAM data repository 225 and/or regulate user access using RBAC lists stored in the permissions data repository 270. In another embodiment, the security gateway 170 may use application authentication instructions 320 to access the virtual IAM data repository 225, or another data repository storing application-based identity information for authentication, and authenticate the application 310 using the identity information received through the edge application 410. In an embodiment, the edge application 410 may be pre-provisioned with authentication token(s). The security gateway 170 may validate the pre-provisioned authentication tokens(s) without the need for user input. Performing the authentication of step 525 may grant the client device 161 access to the first set of one or more transactions.

Each application 310 may be programmatically associated with specific enterprises. For example, a first application 310 may be an AGE application that is supported by the security gateway 170 while a second application 310 may be a Simon application that is also supported by the security gateway 170. Each application 310 may be pre-programmed with an enterprise ID that identifies the specific enterprise. This enterprise ID may be the same ID used by the enterprise device authentication instructions 235 to authenticate the enterprise device 180 at step 510, in an example embodiment. In step 525, for example, the application 310 may be a AGE application that is pre-programmed with a AGE enterprise ID. Authentication instructions 320 may authenticate the client device 161 using the AGE enterprise ID stored in a data repository.

At step 530, in response to performing the second authentication service, the method further comprises encrypting and sending the first set of one or more transactions to the second computing device. In an embodiment, once an application 310 has been authenticated, the security gateway 170 may allow the authenticated application 310 to selectively access the message queue 340 such that only queued timestamp-value pairs corresponding to the application 310 may be selected. For example, an authenticated AGE application may only be allowed access to one or more transactions from AGE devices. The application 310 may encrypt the one or more transactions from the AGE device using the PKI model. For example, the application 310 may encrypt the transaction data using a public key that is accessible to the public and send the encrypted transaction data to the authenticated client device 161. In an embodiment, the corresponding private key, or decryption key, used to decrypt the transaction data may be sent to the client device 161 or pre-provisioned such that only the client device 161 may decrypt the data. In an embodiment, the private key or decryption key may be sent to the client device 161 during the authentication process of step 525 or pre-provisioned.

Since the security gateway 170 is configured for multi-tenancy, additional methods or algorithms may be implemented to accommodate and authenticate numerous applications for accessing specific transaction data in the message queue 340.

For example, at step 535 of FIG. 5B, in response to performing the first authentication, the method may further comprise generating and queuing a second set of one or more transactions corresponding to at least one of the one or more first computing devices. In an embodiment, the security gateway 170 may generate and queue in the message queue 340 a second set of timestamp-value pairs associated with an enterprise device 180. The enterprise device 180 of step 535 may be the same one or more enterprise devices as those of step 505 and step 510 or different one or more enterprise devices from those of step 505 and step 510. For example, in an embodiment, the enterprise device 180 may be the same AGE device, a different AGE device, or a device belonging to another hypothetical enterprise named Simon. The enterprise device 180 may also be the same plurality of AGE devices, a different plurality of AGE devices, or a plurality of Simon devices. Any of number of devices and combinations of devices may be implemented.

At step 540, the method may further comprise receiving a third authentication request from a fourth computing device configured to access the second set of one or more transactions. In an embodiment, the security gateway 170 may receive an authentication request from a second client device 161 that is configured to access the second set of one or more timestamp-value pairs in the message queue 340 once the second device has been authenticated. For example, the second client device 161 may send an authentication request to the security gateway 170 via a web browser or an edge application 410 running on the client device 161.

At step 545, in response to receiving the third authentication request, the method further comprises performing a third authentication service for the fourth computing device on behalf of the third computing device using a third set of identity information. In an embodiment, the security gateway 170 may be programmed with enterprise user authentication instructions 420 or virtual IAM service instructions 220 that authenticate the second client device 161 on behalf of the enterprise server using identity information stored in the virtual IAM data repository 225. In another embodiment, the security gateway 170 may use authentication instructions 320 to authenticate the application 310 using information received through the edge application 410 that runs on the second client device 161. The application 310 may be the same as or a different application from the application 310 of step 525. In an embodiment, the edge application 410 may be pre-provisioned with authentication token(s). The security gateway 170 may validate the pre-provisioned authentication tokens(s) without the need for user input. Performing the authentication of step 545 may grant the second client device 161 access to the second set of one or more transactions.

In an embodiment, performing the authentication of step 525 may grant the client device 161 access to the first set of one or more transactions, but not the second set of one or more transactions. In another embodiment, performing the authentication of step 545 may grant the second client device 161 access to the second set of one or more transactions, but not the first set of one or more transaction. For example, if a first client device 161 is granted access only to transactions from AGE devices, but the second client device 161 is granted access only to transactions from Simon devices, then the first client device may only access the first set of one or more transactions, but not the second set of one or more transactions while the second client device may only access the second set of one or more transactions, but not the first set of one or more transactions.

However, in another embodiment, performing the authentication of step 525 or step 545 may grant a client device 161 access to both the first set of one or more transactions and the second set of one or more transactions. For example, if the client device 161 is authorized to access transactions for a first AGE device through an authorized application 310 that enables access to all AGE device, the client device 161 may also access transactions for a second AGE device.

These examples are non-limiting. Any number of access options may be available based on access control identity information pertaining to users, applications, client devices, enterprise devices, or any other devices.

At step 550, in response to performing the third authentication service, the method further comprises encrypting and sending the second set of one or more transactions to the fourth computing device. In an embodiment, once the application 310 has been authenticated, the security gateway 170 may allow the authenticated application 310 to selectively access the message queue 340 such that only queued timestamp-value pairs corresponding to the application 310 may be selected. For example, an authenticated Simon application may only be allowed access to one or more transactions from Simon devices. The application 310 may encrypt the one or more transactions from the Simon device using the PKI model. For example, the application 310 may encrypt the transaction data using a public key that is accessible to the public and send the encrypted transaction data to the authenticated second client device 161. In an embodiment, the corresponding private key, or decryption key, used to decrypt the transaction data may be sent to the second client device 161 or pre-provisioned such that only the second client device 161 may decrypt the data. In an embodiment, the private key or decryption key may be sent to the second client device 161 during the authentication process of step 545 or pre-provisioned.

Using the foregoing techniques, programmed computers may automatically detect, transfer, store, and utilize data in a manner that maximizes data security and data integrity while improving data delivery to and from both client and enterprise computers. Implementations provide for decreased use of network bandwidth and decreased use of processing resources for enterprise servers that no longer provide direct IAM 120 services to numerous users, applications, and/or devices. In other words, by decentralizing the IAM 120 services, network traffic is no longer concentrated at the enterprise server, which results in less network traffic and use of server processing resources.

Furthermore, the approaches disclosed herein improve data security and data integrity. The use of a blockchain 150 protects the integrity of any data stored in the blockchain 150. The nature of the blockchain 150 also ensures that each new block of data is linked to the previous block, creating an improved method of documenting changes and rejecting unapproved changes. Consequently, the blockchain 150 functions as a secure backup for sensitive identity information with high Byzantine fault tolerance.

Improved data security, decreased processing power, and decreased network bandwidth is also provided by the techniques described herein through the use of the security gateway 170 as a single authentication portal. The security gateway 170 supports multitenancy for different applications, which shifts the use of processing resources away from client devices for authentication. Furthermore, the security gateway 170 also authenticates to each enterprise device 180 on behalf of the client device 161 and/or application 310, regulates client device access to each enterprise device 180 using enterprise IDs and local permissions lists, and generates audit logs of all transactions that it proxies. This improves data security of the entire system while decreasing processing resources for both client devices and enterprise devices.

The security gateway 170 logs every transaction to and from each IoT device to track potential security risks and regulates access through the permissions list so that no device has access where it should not. Authenticating each enterprise device 180 on behalf of the client device 161 and generating an audit log that can deny client device access to potentially compromised enterprise devices has the improved benefit of decreasing the use of processing power and network bandwidth. Since the security gateway 170 will no longer send or receive data to and from the compromised device, network traffic to the compromised device will decrease. Processing power that a client device 161 and/or a compromised enterprise device 180 would otherwise use to send or receive data to and from each other will also decrease. Furthermore, using the security gateway 170 to regulate access control decreases client device 161 processing power since the client device 161 no longer needs to self-regulate access control.

Improved data security is further achieved by the approaches disclosed herein through gateway credentials enterprise device authentication. Enterprise devices often use hardcoded usernames and passwords, which increases the risk of security breaches. However, with the gateway credentials and enterprise device authentication provided by the security gateway 170, gateway credentials may be generated, rotated, and used in place of hardcoded credentials. If an enterprise device 180 were compromised and reset to use the hardcoded credentials, the security gateway 170 would no longer be able to authenticate to the enterprise device 180, and the security gateway 170 may deny of access to and from the compromised device.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
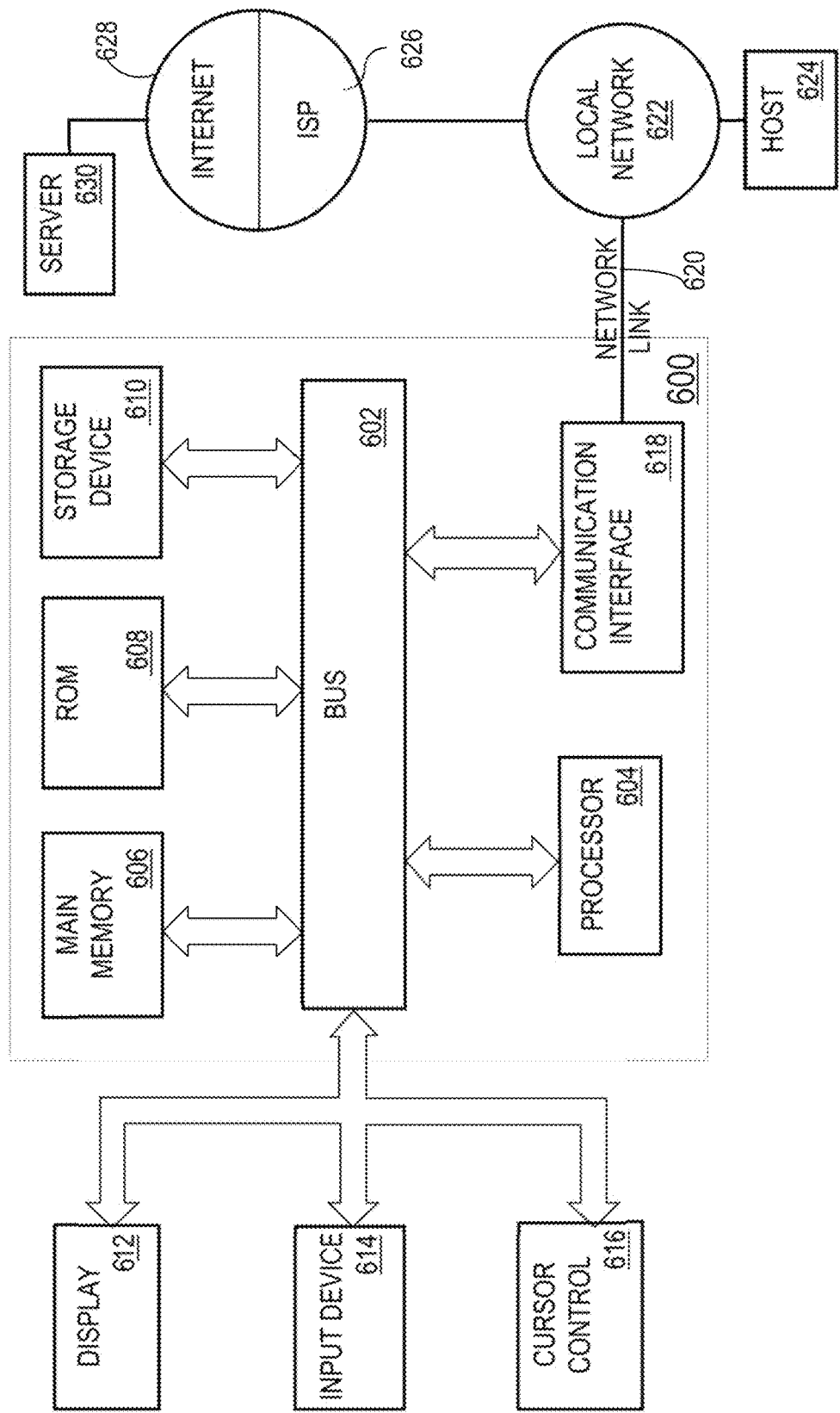
FIG. 6 illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), a liquid crystal display (LCD), or any other display for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   using a gateway device as a single authentication portal, comprising:
      in response to receiving a first authentication request from one or more first computing devices, authenticating the one or more first computing devices on behalf of a first client device using a first set of identity information that is associated with the one or more first computing device;
      in response to authenticating the one or more first computing devices,
         obtaining a first set of one or more transactions from the one or more first computing devices,
         queuing the first set of one or more transactions obtained from the one of the one or more first computing devices;
      in response to receiving a second authentication request from the first client device configured to access the first set of one or more transactions, authenticating the first client device on behalf of a second computing device using a second set of identity information that is associated with the first client device;
      in response to authenticating the first client device, accessing the first set of one or more transactions from the queue, encrypting and sending the first set of one or more transactions accessed from the queue to the first client device.

2. The method of claim 1, wherein using the gateway device further comprises:
   in response to authenticating the one or more first computing devices, generating and queuing a second set of one or more transactions corresponding to at least one of the one or more first computing devices;
   in response to receiving a third authentication request from a second client device configured to access the second set of one or more transactions, authenticating the second client device on behalf of the second computing device using a third set of identity information that is associated with the second client device; and
   in response to authenticating the second client device, encrypting and sending the second set of one or more transactions to the second client device.

3. The method of claim 1, wherein the one or more first computing devices are one or more Internet of Things (IoT) devices, and wherein authenticating the one or more first computing devices comprises authenticating the one or more IoT devices.

4. The method of claim 1, wherein authenticating the first client device on behalf of the second computing device comprises authenticating an application.

5. The method of claim 1, wherein encrypting comprises using a public key encryption.

6. The method of claim 1, wherein the first set of one or more transactions comprises a first set of one or more timestamp-value pairs.

7. The method of claim 2, wherein the second set of one or more transactions comprises a second set of one or more timestamp-value pairs.

8. One or more non-transitory computer-readable storage media storing one or more sequences of program instructions which, when executed by one or more computing devices, cause performing:
   using a gateway device as a single authentication portal, comprising:
      in response to receiving a first authentication request from one or more first computing devices, authenticating the one or more first computing devices on behalf of a first client device using a first set of identity information;
      in response to authenticating the one or more first computing devices,
         obtaining a first set of one or more transactions from the one or more first computing devices,
         queuing the first set of one or more transactions obtained from the one of the one or more first computing devices;
      in response to receiving a second authentication request from the first client device configured to access the first set of one or more transactions, authenticating the first client device on behalf of a second computing device using a second set of identity information that is associated with the first client device;
      in response to authenticating the first client device, accessing the first set of one or more transactions from the queue, encrypting and sending the first set of one or more transactions accessed from the queue to the first client device.

9. The one or more non-transitory machine-readable media of claim 8, wherein using the gateway device further comprises:

in response to authenticating the one or more first computing devices, generating and queuing a second set of one or more transactions corresponding to at least one of the one or more first computing devices;

in response to receiving a third authentication request from a second client device configured to access the second set of one or more transactions, authenticating the second client device on behalf of the second computing device using a third set of identity information that is associated with the second client device; and in response to authenticating the second client device, encrypting and sending the second set of one or more transactions to the second client device.

10. The one or more non-transitory machine-readable media of claim 8, wherein the one or more first computing devices are one or more Internet of Things (IoT) devices, and wherein authenticating the one or more first computing devices comprises authenticating the one or more IoT devices.

11. The one or more non-transitory machine-readable media of claim 8, wherein authenticating the first client device on behalf of a second computing device comprises granting access to the first set of one or more transactions.

12. The one or more non-transitory machine-readable media of claim 9, wherein authenticating the second client device on behalf of the second computing device comprises granting access to the second set of one or more transactions.

13. The one or more non-transitory machine-readable media of claim 9, wherein the first set of one or more transactions comprises a first set of one or more timestamp-value pairs, and wherein the second set of one or more transactions comprises a second set of one or more timestamp-value pairs.

14. The one or more non-transitory machine-readable media of claim 9, wherein encrypting the first set of one or more transactions and the second set of one or more transactions comprises using a public key encryption.

15. A computer system comprising:
one or more processors;
a computer-readable storage media coupled to the one or more processors;
a memory coupled to the computer readable storage media and storing instructions which, when executed by the one or more processors cause a gateway to:
in response to receiving a first authentication request from one or more first computing devices, authenticating the one or more first computing devices on behalf of a first client device using a first set of identity information;
in response to authenticating the one or more first computing devices,
obtaining a first set of one or more transactions from the one or more first computing devices,
queuing the first set of one or more transactions obtained from the one of the one or more first computing devices;
in response to receiving a second authentication request from the first client device configured to access the first set of one or more transactions, authenticating the first client device on behalf of a second computing device using a second set of identity information that is associated with the first client device;
in response to authenticating the first client device, accessing the first set of one or more transactions from the queue, encrypting and sending the first set of one or more transactions accessed from the queue to the first client device.

16. The computer system of claim 15, wherein the memory stores further instructions which, when executed by the one or more processors causes the gateway to:
in response to authenticating the one or more first computing devices, generating and queuing a second set of one or more transactions corresponding to at least one of the one or more first computing devices;
in response to receiving a third authentication request from a second client device configured to access the second set of one or more transactions, authenticating the second client device on behalf of the second computing device using a third set of identity information that is associated with the second client device; and
in response to authenticating the second client device, encrypting and sending the second set of one or more transactions to the second client device.

17. The computer system of claim 16, wherein the one or more first computing devices are one or more Internet of Things (IoT) devices, and wherein authenticating the one or more first computing devices comprises authenticating the one or more IoT devices.

18. The computer system of claim 17, wherein the first set of one or more transactions comprises a first set of one or more timestamp-value pairs.

19. The computer system of claim 18, wherein the second set of one or more transactions comprises a second set of one or more timestamp-value pairs.

20. The computer system of claim 19, wherein authenticating the first client device on behalf of a second computing device comprises granting access to the first set of one or more transactions and not the second set of one or more transactions, and wherein authenticating the second client device on behalf of the second computing device comprises granting access to the second set of one or more transactions and not the first set of one or more transactions.

* * * * *